United States Patent [19]

Gur-Arieh et al.

[11] 3,984,580

[45] Oct. 5, 1976

[54] METHOD OF CONTAINERIZING FRUIT

[75] Inventors: Chaim Gur-Arieh, Berkeley; Fred G. Cordes, Oakland; Robert B. Baylor, Berkeley, all of Calif.

[73] Assignee: Del Monte Corporation, San Francisco, Calif.

[22] Filed: Dec. 8, 1975

[21] Appl. No.: 639,002

Related U.S. Application Data

[63] Continuation of Ser. No. 451,832, March 18, 1974, abandoned.

[52] U.S. Cl. ............................ 426/639; 426/658; 426/399; 426/400; 426/402; 426/404
[51] Int. Cl.² ........................................... A23B 7/08
[58] Field of Search ........................... 426/639, 658

[56] References Cited
UNITED STATES PATENTS

| | | | |
|---|---|---|---|
| 3,281,251 | 10/1966 | Templeton | 426/352 |
| 3,337,349 | 8/1967 | Savage | 426/352 |
| 3,425,848 | 2/1969 | Camirand | 426/310 |

Primary Examiner—Jeanette M. Hunter
Attorney, Agent, or Firm—Flehr, Hohbach, Test, Albritton & Herbert

[57] ABSTRACT

A method for shrinking and containerizing pieces of fruit (e.g., peaches and pineapple) wherein the fruit is treated by total immersion in excess syrup, which immersion is conveyed through a heating zone maintained in excess of sterilizing temperatures with sufficient residence time to shrink the fruit and remove intercellular gases. The fruit is then drained of syrup and filled and sealed in containers also at sterilizing temperatures.

10 Claims, No Drawings

METHOD OF CONTAINERIZING FRUIT

This is a continuation, of application Ser. No. 451,832 filed Mar. 18, 1974 now abandoned.

BACKGROUND OF THE INVENTION

Many different techniques have been employed in the canning of fruit such as pineapple and peaches. For example, in the technique described in U.S. Pat. No. 1,782,761, pineapple is canned in the absence of syrup. The pineapple pieces first are saturated with warm syrup in an air-tight tank. Then, a high vacuum of about 29 inches is drawn in the tank for several minutes to remove air from the pieces. Thereafter, air is admitted into the tank and the atmospheric pressure drives the syrup into the voids of the pineapple pieces to saturate the same. Finally, the pieces are drained and sealed in cans which are then retorted at sterilizing temperatures.

An important deficiency of the above technique of processing pineapple is that drawing the high vacuum for the indicated time to drive out the air is an extremely expensive operation. Also, at the indicated pressure, the boiling point is substantially below sterilizing temperatures. Thus, it is not possible to raise the fruit temperature to a level sufficient for sterilization during treatment in the tank. Thus, it is necessary to sterilize the pineapple after canning. This is relatively expensive since the heat must be sufficient to raise the coldest portion of the fruit in the center of the can to sterilizing temperatures which requires heating the fruit to the outside of the can well above that temperature for a relatively long time. This prolonged cooking imparts an undesirable cooked taste or off-flavor to this outside fruit and causes the vitamin C content of the fruit to be substantially reduced. Furthermore, this heating step slows down the entire canning operation.

Conventional operations presently employed in the canning of fresh fruit include filling the fruit pieces in the cans prior to treatment with syrup. This requires that the fruit be sterilized within the cans, an inefficient operation for the reasons set forth above. Also, there is no ability to drain the syrup from the fruit prior to sealing the cans.

SUMMARY OF THE INVENTION AND OBJECTS

The present invention relates to an improved method for shrinking and containerizing pieces of fruit in a manner suitable for long-term storage.

It is an object of the invention to treat and containerize the fruit in an economical and rapid manner which avoids the inefficiencies of prior art techniques.

It is a further object of the invention to provide a method of the above type in which the fruit is shrunken and drained prior to containerizing to produce a relatively high drain weight of fruit in the containers.

It is another object of the invention to provide a technique in which during shrinking the fruit is raised to sterilizing temperatures to avoid substantial heat treatment of the fruit after containerizing.

It is another object of the invention to provide a technique for containerizing fruit with a high drain weight.

In accordance with the above objects, pieces of fruit such as pineapple or peaches are shrunken and containerized. During shrinking, the fresh fruit pieces are totally immersed in syrup and continuously conveyed through a heating zone maintained in excess of sterilizing temperatures and at atmospheric pressure. The fruit remains in the heating zone for a sufficient time to cause a substantial drop in the liquid content of the fruit to shrink it. The thus treated fruit is drained and then filled and sealed in containers at a sterilizing temperature. When the above process is carried out on fruit such as peaches wherein the sugar content of the canned fruit as indicated by the soluble solids refractive index, is substantially higher than that of the fresh fruit, the liquid lost by the fruit is relatively low in sugar due to an osmotic effect. Thus, the shrunken fruit retains an increased proportion of soluble solids.

DETAILED DESCRIPTION OF THE PREFERRED EMBODIMENTS

The present process is carried out upon fruits which are containerized as in cans or glass jars. Such fruits include apples, peaches, pears, pineapples and the like. Canning will be described as the specific technique of containerizing herein.

The fruit should be able to withstand the pumping, cooking, and filling operation without substantial damage to the same. In processing pears, the operation conditions are carefully controlled to be mild to avoid the tendency of the pears to slough off during high temperature handling.

The process is first described with respect to the canning of peaches. To withstand handling at high temperature, so-called cannery ripe fresh fruit having a firm body is fed to the system. Such peaches are substantially less sweet than ripe peaches suitable for eating. For example, cannery ripe peaches may include a soluble solids content of 10 compared to 15% for eating quality peaches. Soluble solids content as measured by refractive index readings is a standard technique for approximating the sucrose and other sugar content of fruit. Soluble solids also include the acid content of the fruit but this is a relatively minor quantity compared to the sugars. The peaches are sliced in a conventional technique so as to provide a cross-sectional area suitable for canning. The pieces should be small enough to permit rapid heat penetration. A suitable size for this purpose is on the order of ½ inch to ¾ inch in thickness.

After slicing or dicing of the fresh fruit, the fruit pieces are treated by totally immersing the same in a syrup of sugar dissolved in water. A suitable composition of the soluble solids in the syrup is 75% sucrose and 25% corn syrup. The immersion of fruit in syrup is continuously conveyed through a heating zone of a heat exchanger type in which the agitation is low enough to avoid excessive damage to the fruit. Suitable heat exchangers are of the shell and tube type wherein the fruit and syrup immersion passes through the tubes and the heating liquid, hot water, passes through the shell. Another heat exchanger which can be employed is of the thermal screw type in which the immersion is fed from a hopper into a screw feed which conveys the material through a heating chamber.

Heating the fruit pieces in contact with the sugar syrup under the conditions described below accomplishes a number of important objectives. One objective is the removal of intercellular gases in the interstices of the fruit to a level below that which would give the fruit an off-flavor on storage under containerization. Oxygen remaining in the cans after seaming can accelerate corrosion of the cans.

Another reason for such heat treatment is to sterilize the fruit prior to filling the cans. In the heating zone, the fruit is in contact with an excess of syrup which transmits the heat to the fruit by convection as well as conduction. This is highly efficient in comparison to the conventional technique of sterilizing in the container, especially where there is relatively little syrup and a substantial amount of voids as in the product of the present process. Heating to sterilizing temperatures in the can would be accomplished primarily by conduction which is inefficient because of the air pockets. Also, sufficient holding time is required in such conventional techniques to heat the coldest spot at the center of the can to sterilizing temperature. This tends to give the fruit a cooked taste.

A further reason for heat treating the peaches in contact with the syrup is to lower the water content of the fruit while retaining the natural sugar content within the fruit. This provides a relative increase in such natural fruit sugar content by shrinkage for flavor improvement. The soluble solids content of the fresh fruit pieces is increased by the mechanism of osmosis. For this purpose, the heat and residence time within the heating zone is sufficient to cause a substantial drop in the liquid content and thus weight of the fresh fruit pieces. The soluble solids content of the syrup is substantially higher than that of the fresh fruit pieces. Thus, the application of heat accelerates the mechanism of osmosis through the semi-permeable membrane walls of cells within the fruit. The diffused liquid is low in soluble solids content as compared to that of the syrup or even the fresh fruit. It is believed that such liquid is essentially water.

The shrinkage of the fruit during processing leads to economy of shipping as explained hereinafter. Such shrinkage is at least 15% of the fresh fruit and may be as high as 30% or more.

Summarizing the foregoing, the temperature in the heating zone is sufficient to sterilize the fruit, shrink the fruit pieces and also to remove enough intercellular gases from the fruit to prevent oxidative chemical reactions which damage the quality of the product in flavor and in color and which accelerate container deterioration. At a temperature in the heating zone of, say, 190°F, a suitable residence time to accomplish all of these objectives is on the order of five to seven minutes. Increasing the temperature above this value reduces the residence time. By raising the heating zone temperature to, say, 210°F, a residence time of two to four minutes is adequate. By reducing heat losses to a minimum, sufficient heat can be retained in the fruit to convey the same to the canning and sealing operations at sterilizing temperatures. This avoids the uneconomical step of sterilizing the fruit after seaming the cans. Thus, a preferred temperature is that which will enable the fruit to be heat treated and containerized at sterilizing temperatures without the necessity of further heat treatment of the fruit.

Although holding the fruit at 182°-185°F is sufficient for sterilization, it is preferred that the fruit be heated to at least 190°F for at least one minute in the heating zone to eliminate potentially harmful enzymes. The efficiency of the heating zone for raising the temperature of the fruit has been described above.

The above temperatures refer to the temperature of the syrup in the heating zone rather than the internal temperature of the fruit which is difficult to monitor in the heat exchanger. The fruit pieces exit the heat exchanger at approximately a few degrees Fahrenheit below the syrup temperature. It has been found to be most efficient to pre-heat the syrup to the desired maximum temperature prior to flowing into the heat exchanger.

In general, it is most efficient to carry out the process at a temperature just below the boiling point of the syrup and to preheat the syrup to the desired temperature of the heat exchanger. Of course, if the boiling temperature is exceeded, the syrup will flash off.

It is preferable to operate the heating zone at about atmospheric pressure. An increase in the pressure above atmospheric in the heat exchanger will enable the system to be operated at a higher temperature and thus with a lower residence time. However, it is impractical to operate a heat exchanger of this type under excessive pressures. Operating the system under a vacuum would also be impractical because it will necessitate using lower temperatures, requiring post-canning sterilization of the product.

The soluble solids content of the treated peaches is substantially higher than that of the fresh fruit as a result of at least two different mechanisms. As set forth above, there is a drop in the water content of the fruit during shrinkage under the influence of osmosis and so there is a relative increase in the sugar content of the fruit. Also, a certain amount of the sugar from the syrup of relatively high soluble solids content is adsorbed by the fruit. Cannery ripe peaches have a soluble solids content on the order of about 9-10% while that of the desired canned product is on the order of 19-20%. In a conventional canning process, the increase in soluble solids content is at least 50% after processing. Essentially all of this increase would occur in the heating zone of the present process. The soluble solids content of cannery ripe pears is slightly higher, varying from about 10 to 15% while that of the desired canned product suitably varies from about 20 to 25%. Thus, for both canned peaches and pears, the soluble solids content of the canned fruit is approximately twice that of the fresh fruit.

To accomplish significant increases in soluble solids, the syrup being supplied to the heat exchanger must be substantially higher in soluble solids than that of the fruit entering the heat exchanger. The ratio of the former to the latter may be 2:1 or more for this purpose. At the concentrations of the present process, for a doubling of soluble solids content in both pears and peaches, it has been found that the entering syrup has approximately twice the desired soluble solids content compared to the fruit exiting from the heat exchanger.

For both peaches and pears, shrinkage due to osmotic water loss is substantial. For peaches, losses at the above operating conditions may vary from about 15 to 20%, or more. For pears, this value may be substantially higher, varying from about 20-30% or more.

The flow rate of the immersion of fruit pieces in syrup through the heat exchanger as well as the ratio of fruit to syrup can be varied over a wide range. A suitable flow rate is 25 pounds of fruit per minute. At this flow rate, the amount of syrup by weight may vary from, say one to five or more times by weight than that of the fruit depending upon the type and capacity of the heat exchanger.

After exiting from the heating zone, the peach pieces are drained of substantially all free syrup. This is suitably accomplished by passing the fruit pieces along a vibratory conveyor such as on a shaking screen to the next operation of filling the cans. The ability to drain the fruit of syrup after treatment in the heating zone is an important feature of the present invention. This enables effective conductant heat exchange to the fruit pieces from a large volume of heated syrup while canning with relatively little syrup. Thus, the addition of extraneous syrup is optional for the purpose of controlling the drained weight and final concentration. This flexibility is made possible by carrying out the steps of shrinking and raising the soluble solids content prior to filling.

Another important commercial feature of the present process is that heating to sterilizing temperature is not required after the seaming operation since the temperature of the fruit is maintained above sterilizing temperatures from the heating zone through sealing. Thus, it is most economical to minimize the heat losses from the heat exchanger to filling. By minimizing the conveyor run, it is possible to limit evaporative cooling losses to 10°F or less. Thus, fruit exiting from the heat exchanger at, say, 200°–210°F, is conveyed to the filler at a temperature of from 190°–200°F, well in excess of sterilizing temperatures.

The syrup which is drained from the fruit pieces on the screen can be recycled to the heat exchanger. Prior to recycle, the soluble solids content is again raised to the desired level by adding further sugars of the desired type. Also, waste pieces of fruit which have passed through the conveyor screen at this point are removed to prevent accumulation which could clog the system. For this purpose another screen may be interposed in the recycle line with the material retained on the screen being passed to waste.

After draining, the fruit pieces are passed to a filler for depositing the pieces into cans. A filler suitable for this purpose loads the cans in a sufficiently short time to prevent excessive heat losses. More particularly, the temperature of the product should not drop below sterilizing temperatures at this point. One conventional filler which may be adapted for use is a so-called pocket filler. The fruit pieces are deposited from the conveyor onto a turrent which includes pockets or cylinders with valve openings at the bottom. The cylinders have precisely the same volume as the cans. Excess product may be removed from the top of the cylinders as by scraping. Thereafter, the valve at the bottom of the cylinder is opened over the can.

The fruit pieces are either packed in the drained condition without additional syrup or a relatively minor amount of syrup is added at this point. It is preferred that the final product have a relatively high drain weight, e.g., at least 80–90%, upon filling. This value will increase to, say, 90–95%, after 30 days of storage. Thus, the total amount of syrup added to the cans is no greater than 10–20%, the major portion of which is absorbed by the shrunken fruit during long-term storage. The amount of syrup added is substantially below an amount which would fully cover the fruit pieces after 30 days of storage.

The soluble solids content of this added syrup may be varied to adjust the sweetness of the final product. Thus, the concentration of the added syrup may be either less than equal to or greater than that of the canned fruit. In general, however, this concentration would be lower than that of the syrup exiting from the heating zone.

The cans are sealed under vacuum because there is insufficient syrup therein to totally fill the cans. Thus, there is a head space containing air which must be evacuated prior to sealing. Otherwise, the oxygen in the air would have the same type of detrimental effect on the fruit as the intercellular gases in the fruit as described above.

One technique for sealing the cans employs two steps. In the first one, lids are placed on the cans and clenched or crimped in a few places sufficient for firm retention but insufficient to prevent gas communication between the interior of the can and the surroundings. Thereafter, the cans pass through a transfer port into a vacuum chamber wherein a vacuum suitably on the order of about 15 inches of mercury is drawn and the lid is double sealed to the can. Thereafter, the cans are conveyed through another transfer port out of the vacuum chamber. Filling and sealing can be accomplished in about 20 seconds.

At no point during filling or sealing is the temperature of the fruit permitted to fall below sterilizing temperatures of, say, 185°F. Otherwise, it would be necessary to resterilize the fruit pieces by heating the cans themselves to a sufficient extent to reheat all of the fruit pieces in the can to, say, 185°F.

The cans are either preheated prior to sealing or heated to sterilizing temperatures after filling and sealing. In the latter instance, the filled cans are suitably conveyed through a steam tunnel at atmospheric pressure for a suitable period of time of 5 minutes. At atmospheric pressure, the steam temperature is at approximately 212°F.

The product of the above process has a drain weight of as high as 80–95% or more. It has a more natural taste and texture than that of conventionally canned fruit. An important reason for this is that the fruit is subjected to less heat treatment due to the efficient manner of heating. This is reflected in the high vitamin C content of the present product in comparison to fruit canned by conventional techniques. An important factor contributing to the fresh taste of the fruit is the fact that the relative content of natural sugar is higher in this product as compared to conventionally canned peaches. Thus, the final shrunken fruit includes a relatively high proportion of natural sugar in comparison to the extraneous sugar added with syrup.

The process is economical because more fruit can be packed in a given can, reducing shipping costs. This is because the fruit is in a shrunken condition. Also, during heat treatment prior to canning, the fruit is softened and thus rendered substantially more pliable for packing into a compact mass.

Although the above process is described generally with respect to peaches, it should be understood that essentially the same conditions may be used to process other fruits in which the soluble solids content of the fruit is to be increased such as pears, apples and the like. In another departure from the above description, other containers such as glass jars, may be employed with appropriate modifications in the process of filling and sealing.

The above process is modified for the treatment of pineapple. This is because the soluble solids content of the canned pineapple conventionally about 15 to 16%, is substantially the same as that of fresh pineapple pieces. Here, the precanning heat treatment step of the process is carried out for the combined purposes of sterilization, shrinking of the fruit and removal of the intercellular gases from within the same. Although fresh pineapple fruit can have a soluble solids as low as 10%, most fresh pineapple used for canning is between 14 and 16% soluble solids. Fruit with 10% soluble solids can be sweetened by the process described above with respect to peaches.

For processing pineapple the major difference in the conditions of the heating zone is that the soluble solids content of the syrup is maintained at essentially the same level as that of the fruit. The conditions of temperature and residence time are generally the same as those described above.

It has been found that under the above conditions the pineapple pieces have a greater loss in weight than the peaches and pears described above. Such loss is mainly due to juices driven out of the fruit in the heat exchanger. Thus, the weight loss of the fruit leaving the heating zone can be one-quarter to one-third or more of the fresh fruit. In another mode of expression, such treated fruit may be shrunken to as little as three-fourths to two-thirds of its original weight.

The present process can be carried out on pineapple in two different procedures for different purposes. In one procedure, the fruit is cut into slices or chunks suitable for packing in cans with pineapple as the sole fruit. Here, the pineapple pieces exiting from the heat exchanger are treated in the manner of the peaches described above. That is, the fruit is drained of syrup on a vibratory conveyor such as a screen or the like and directed to a filler and vacuum sealing apparatus as described above. As with peaches, the temperature of the pineapple is maintained at a level above that required for sterilization during the entire process. Also, the cans are conventionally sterilized after sealing. Also, similar to the above technique, the addition of extraneous syrup to the cans is limited to be insufficient to cover the pineapple pieces. Drain weights on the order of those described above can be attained with pineapple.

In the above technique for pineapple, the same advantages outlined with respect to peaches are obtained. The final product has a fresher taste since it is cooked less than conventionally canned pineapple. Furthermore, since less syrup is packed in the can, the shipping costs of the can is reduced for a given net weight of fruit.

The above technique for pineapple is slightly modified where the fruit pieces are to be used in fruit cocktail. Here it is conventional to fill a large can with pineapple at a distant source (e.g., Hawaii or the Philippines) to be shipped to the source of the remaining fruit (e.g., mainland United States) for repacking in a fruit cocktail. Shipping costs for the pineapple pieces in cans over such long distances are relatively high. It has been found that shrinking the pieces in the manner described above by as much as 50% yields a substantially greater amount of the shrunken pineapple pieces which can be packed in a comparably sized can. Thus, the shipping costs are greatly reduced.

Referring to the specific parameters of the process for this latter application to pineapple, the first stage of treatment in the heating zone is the same as that described above with respect to peaches. Thereafter, there is no need to drain all excess syrup as the cans to be filled are not sold directly to the consumer. The fruit pieces can be filled into the can with, say, a drain weight of 75% and sufficient syrup to fill to the top of the cans. This enables such cans to be sealed without application of a vacuum. As with the above processes, sterilizing temperatures are maintained throughout the process. When the above cans reach the fruit cocktail canning plant, the pineapple pieces are fed in their shrunken condition as a source material for fruit cocktail. Since the fruit cocktail is packed with a syrup medium, the shrunken tidbits absorb some of this syrup and expand to a size comparable to fruit processed conventionally. Accordingly, the shipping weight of material stock pineapple tidbits for a given quantity of fruit cocktail is substantially reduced.

In order to more clearly disclose the nature of the present invention, specific examples are set forth below. Such examples are not intended to delineate the scope of the invention. Parts are expressed in terms of part of weight, unless otherwise designated.

EXAMPLE 1

Cling peaches of cannery ripeness having a soluble solids content of 9.1% as measured by its refractive index are diced into pieces of a size suitable for passing through a heat exchanger. A syrup is formulated having a soluble solids content of 40.4% wherein such solids comprise 75% sucrose and 25% corn syrup. The syrup is heated to a temperature of about 210°F, slightly below its boiling point. The diced peaches and heated syrup are pumped into a heat exchanger at a ratio of 1.6 parts by weight of syrup per part by weight of peaches. In this instance, the heat exchanger is of a shell and tube type with sufficient tubing (i.d. one and seven-sixteenths inches) of a split tube construction for seven passes within the exchanger. Hot water is the heat medium in the shell. The residence time of the fruit in syrup immersion within the heat exchanger is approximately three minutes during which the fruit reaches a temperature approximately a few degrees below that maintained in the heat exchanger, i.e., about 210°F.

From the heat exchanger, the fruit is drained of excess syrup on a porous screen vibratory conveyor. The soluble solids content of the syrup exiting from the conveyor is 32% while that of the fruit is 19.2%. The syrup passing through the openings of the conveyor is recycled to the heat exchanger after passing a finer secondary screen to remove accumulating fine waste peach particles. Also, make-up sugar was added to reach the desired level of soluble solids entering the heat exchanger. Approximately 78.5% of the fresh peaches were ultimately canned. Of this amount, 2.6% was removed on the secondary screen as waste while 18.9% was liquid, primarily water lost during the shrinkage of the fruit in the pass through the heat exchanger.

At the exit end of the vibratory conveyor the peach pieces were filled manually into cans. The drop in temperatures of the peach pieces on the conveyor is on the order of 5° to 10°F so that the temperature of the pieces to the filler is on the order of 195° to 200°F. The cans are sealed in two steps. In the first one, lids are placed on the cans and crimped in four places leaving enough openings for gaseous communication with the surroundings. Thereafter, the cans pass through a transfer port into a vacuum chamber wherein a vacuum of 15 inches of mercury is drawn and the cans are sealed by double seaming the lids to the cans. Then the cans are conveyed out of the vacuum chamber. A total time for filling and seaming the cans is about 20 seconds. Only a very small heat loss occurs during this short time and the fruit pieces are maintained above 190°F.

After seaming, the cans are conveyed through a steam tunnel at atmospheric pressure for 5 minutes to sterilize the cans.

A statistical summary of certain parameters of the process are summarized in the below identified Table 1 referring to the process described above as Run No. 1 and including four additional runs, each with a ratio of 1.6 parts of syrup to 1.0 parts of diced peaches.

TABLE 1

| | Processing of 100 Lbs. of Diced Cling Peaches | | | | | | ¹Lbs. Sugar Used/ 100 Lbs. Fi |
|---|---|---|---|---|---|---|---|
| Run No. | % Fruit Canned | % Waste | Liquid Loss % From Fruit | Fi/Fo (% SS) | Si (% SS) | Waste (% SS) | |
| 1 | 78.5 | 2.6 | 18.9 | 9.1/19.2 | 40.4 | 32.0 | 6.8 |
| 2 | 80.6 | 3.0 | 16.3 | 10.2/19.2 | 40.7 | 30.9 | 6.2 |
| 3 | 80.7 | 2.4 | 16.9 | 9.9/20.2 | 42.0 | 32.0 | 6.1 |
| 4 | 79.3 | 2.1 | 18.6 | 8.9/18.7 | 42.7 | 30.0 | 6.4 |
| 5 | 82.0 | 1.7 | 16.2 | 8.9/19.4 | 43.1 | 32.0 | 7.2 | wherein;
Fi = Fruit going into the heat exchanger
Fo = Fruit coming out of heat exchanger
Si = Syrup going into the heat exchanger
% SS = % Soluble solids by R.I.
¹Lbs. of sugar picked up by fruit in heat exchanger (including sugar in waste fruit) expressed on the basis of 100 lbs. of feed.

Sample calculation (Run 1)
Sugar picked up by fruit during process = (sugar in canned fruit) + (sugar in waste) − sugar in fresh fruit
= (78.5 × 19.2/100) + (2.6 × 32/100) − (100.0 × 9.1/100)
= 15.1 + .8 − 9.1
= 6.8 lbs.

EXAMPLE 2

The above procedure is generally employed with a batch of sliced cling peaches. One difference is that a ratio of 4.5 parts of syrup to 1.0 parts of sliced cling peaches by weight was used. Another difference was that a mechanical filler was used at the end of the conveyor to deposit the peach slices in the cans. The results of the above runs are summarized in Table 2 below. The formula for calculating the pounds of sugar used was the same as the one set forth with respect to Table 1. The syrup added column refers to the syrup added directly into the can along with the fruit pieces immediately prior to sealing.

TABLE 2

| | Processing of 200 Lbs. of Sliced Cling Peaches | | | | | | |
|---|---|---|---|---|---|---|---|
| Run No. | % Fruit Canned | % Waste | Liquid Loss % From Fruit | Fi/Fo (% SS) | Si (% SS) | Waste (% SS) | Lbs. 25% SS Syrup Added During Canning/ 100 Lbs. Fi | Lbs. Sugar Used/ 100 Lbs. Fi |
| 1 | 75.6 | 2.4 | 22.0 | 11.5/20.6 | 44–46 | 33.4 | 16.2 | 4.9 |
| 2 | 76.1 | 2.4 | 21.5 | 11.2/20.1 | 44–46 | 33.4 | 16.4 | 4.9 |
| 3 | 74.0 | 2.2 | 24.0 | 11.0/20.0 | 44–46 | 44.5 | 16.7 | 4.8 |
| 4 | 75.3 | 2.2 | 22.5 | 11.4/21.1 | 44–46 | 44.5 | 16.5 | 5.5 | wherein;
Fi = Fruit going into the heat exchanger
Fo = Fruit coming out of the heat exchanger
Si = Syrup going into the heat exchanger
% SS = % Soluble Solids by R.I.

It is believed that the difference in yield between the runs of Examples 1 and 2 is that use of the mechanical filler resulted in increased losses in syrup and a decreased yield.

EXAMPLE 3

The general procedure of Example 1 with the same ratio of syrup to fruit was employed in this Example. The results are summarized in Table 3 below.

TABLE 3

| | Processing of 100 Lbs. of Diced Bartlett Pears | | | | | | Lbs. Sugar Used/ 100 Lbs. Fi |
|---|---|---|---|---|---|---|---|
| Run No. | % Fruit Canned | % Waste | Liquid Loss % From Fruit | Fi/Fo (% SS) | Si (% SS) | Waste (% SS) | |
| 1 | 69.3 | 6.4 | 24.2 | 11.2/20.4 | 41.6 | 36.8 | 5.3 |
| 2 | 63.3 | 11.2 | 25.5 | 11.4/21.6 | 41.4 | 38.9 | 6.8 |
| 3 | 64.3 | 7.0 | 28.6 | 10.4/20.3 | 42.7 | 36.7 | 5.2 |

TABLE 3-continued

| | Processing of 100 Lbs. of Diced Bartlett Pears | | | | | Lbs. Sugar Used/ 100 Lbs. Fi |
|---|---|---|---|---|---|---|
| Run No. | % Fruit Canned | % Waste | Liquid Loss % From Fruit | Fi/Fo (% SS) | Si (% SS) | Waste (% SS) | |
| 4 | 64.5 | 7.9 | 27.5 | 10.9/ 21.0 | 42.4 | 37.8 | 5.6 |
| 5 | 67.3 | 8.0 | 24.7 | 11.2/ 22.1 | 42.8 | 37.2 | 6.6 | wherein;
Fi = Fruit going into the heat exchanger
Fo = Fruit coming out of heat exchanger
Si = Syrup going into the heat exchanger
% SS = % Soluble Solids by R.I.

It is noted that the percent waste of the pears is significantly higher than that of the peaches. This is because pears have a greater tendency to slough off during heat processing than do peaches.

EXAMPLE 4

The procedure of Example 2, including the ratio of syrup to fruit, is employed with respect to 100 pounds of pineapple cubes. The results of this experiment are set forth in Table 4 below.

TABLE 4

| | Processing of 100 Lbs. of Pineapple Cubes | | | | Lbs. 20% SS Syrup Added During Canning/ 100 Fi |
|---|---|---|---|---|---|
| Run No. | % Fruit Canned | % Waste | % Liquid Losses | Fi/Fo (% SS) | Si (% SS) | |
| 1 | 62.8 | 5.8 | 31.4 | 15.6/ 15.9 | 15.0 | 6.3 |
| 2 | 62.0 | 5.9 | 32.1 | 15.4/ 16.0 | 15.0 | 6.2 | wherein;
Fi = Fruit going into the heat exchanger
Fo = Fruit coming out of heat exchanger
Si = Syrup going into the heat exchanger
% SS = % Soluble Solids by R.I.

It is apparent that pineapple has a tendency to shrink to a significantly greater extent than peaches or pears under comparable heat processing conditions. This renders the process particularly well adapted to shrinking pineapple for economy of shipment.

We claim:

1. In a method for shrinking and canning pieces of fruits in a manner suitable for long term storage, the steps of treating fresh fruit pieces by totally immersing the same in an excess of aqueous sugar syrup and continuously conveying the immersion through a heating zone maintained in excess of the sterilizing temperature for the fruit at about atmospheric pressure with a sufficient residence time to cause the fresh fruit pieces to shrink by at least about 15% and to remove intercellular gases in the fruit to below a level which would cause an off flavor and color in the fruit during storage under containerization; draining syrup from the treated fruit; raising the sugar content of at least a portion of the drained syrup to the desired level for shrinkage of the fruit; recycling the last named syrup portion to the heating zone; filling the drained fruit pieces at sterilizing temperature in cans together with a limited amount of additional syrup for absorption by the shrunken fruit, said syrup having a sugar concentration less than the concentration of said drained syrup, the quantity of said syrup being substantially below an amount which would cover the fruit pieces in the cans after 30 days of storage and sealing the cans with the fruit pieces at a sterilizing temperature.

2. A process as in claim 1 in which the drain weight of the fruit in the sealed containers is at least 90% after 30 days of storage.

3. A process as in claim 1 in which at the beginning of the heating zone, the soluble solids content of the syrup is at least twice than that of the fresh fruit pieces.

4. A process as in claim 1 in which the fruit is selected from the group consisting of apples, peaches, pears and pineapples.

5. A process as in claim 1 in which the fruit is peaches.

6. A process as in claim 1 in which the fruit pieces are maintained in the heating zone at a temperature in excess of 190°F for at least three minutes.

7. A process as in claim 1 in which the soluble solids content of the fruit pieces leaving the heating zone is at least 50% by weight higher than that of the fresh fruit.

8. A process as in claim 1 in which substantially all of the free syrup is removed from the fruit pieces during the draining step.

9. The method of claim 1 in which the total time for shrinkage of said fruit in said heating zone is no greater than about 7 minutes.

10. In a method for shrinking and packing pieces of fruit in jars in a manner suitable for long term storage, the steps of treating fresh fruit pieces by totally immersing the same in an excess of aqueous sugar syrup and continuously conveying the immersion through a heating zone maintained in excess of the sterilizing temperature for the fruit at about atmospheric pressure with a sufficient residence time to cause the fresh fruit pieces to shrink by at least 15% and to remove intercellular gases in the fruit to below a level which would cause an off flavor and color in the fruit during storage under containerization; draining syrup from the treated fruit; raising the sugar content of at least a portion of the drained syrup to the desired level for shrinkage of the fruit; recycling the last named syrup portion to the heating zone; filling the drained fruit pieces at sterilizing temperature in jars together with a limited amount of additional syrup for absorption by the shrunken fruit, said syrup having a sugar concentration less than the concentration of said drained syrup, the quantity of said syrup being substantially below an amount which would cover the fruit pieces in the jars after 30 days of storage and sealing the jars with the fruit pieces at a sterilizing temperature.

* * * * *